(12) United States Patent
Fitzpatrick

(10) Patent No.: US 8,903,306 B2
(45) Date of Patent: Dec. 2, 2014

(54) METHOD FOR CONTROLLING SIGNAL TRANSMISSION FOR MULTIPLE DEVICES

(75) Inventor: John James Fitzpatrick, Indianapolis, IN (US)

(73) Assignee: Thomson Licensing, Issy les Moulineaux (FR)

(*) Notice: Subject to any disclaimer, the term of this patent is extended or adjusted under 35 U.S.C. 154(b) by 463 days.

(21) Appl. No.: 12/737,871

(22) PCT Filed: Sep. 26, 2008

(86) PCT No.: PCT/US2008/011208
§ 371 (c)(1),
(2), (4) Date: Feb. 23, 2011

(87) PCT Pub. No.: WO2010/036223
PCT Pub. Date: Apr. 1, 2010

(65) Prior Publication Data
US 2011/0151769 A1   Jun. 23, 2011

(51) Int. Cl.
*H04H 20/71* (2008.01)
*H04N 7/20* (2006.01)
*H04H 40/90* (2008.01)
*H04H 20/63* (2008.01)

(52) U.S. Cl.
CPC ............. *H04N 7/20* (2013.01); *H04H 20/63* (2013.01); *H04H 40/90* (2013.01)
USPC .......... 455/3.01; 455/3.02; 343/850; 343/857

(58) Field of Classification Search
CPC ............. H04B 1/18; H04N 7/20; H04H 40/90
USPC ........................................................ 455/3.01
See application file for complete search history.

(56) References Cited

U.S. PATENT DOCUMENTS

| 5,990,794 | A | 11/1999 | Alicot et al. |
| 6,424,947 | B1 | 7/2002 | Tsuria et al. |
| 6,445,359 | B1* | 9/2002 | Ho .................. 343/840 |
| 6,693,587 | B1* | 2/2004 | Kuether et al. .......... 342/359 |
| 6,944,878 | B1* | 9/2005 | Wetzel et al. ............... 725/72 |
| 7,016,643 | B1* | 3/2006 | Kuether et al. ........... 455/3.02 |

(Continued)

FOREIGN PATENT DOCUMENTS

| CN | 101023670 | 8/2007 |
| EP | 1931138 | 6/2008 |

(Continued)

OTHER PUBLICATIONS

PCT Search Report dated Apr. 23, 2009.

(Continued)

*Primary Examiner* — Hai V Nguyen
(74) *Attorney, Agent, or Firm* — Robert D. Shedd; Kuniyuki Akiyama

(57) ABSTRACT

A method is capable of controlling signal transmission for multiple electronic devices in a system such as a satellite distribution system. According to an exemplary embodiment, the method includes steps of receiving a signal indicating a request from a device, changing an operating state of a signal source to be compatible with an operation of the device in response to the signal, and providing a signal path between the device and the signal source in response to the signal.

6 Claims, 5 Drawing Sheets

(56) References Cited

U.S. PATENT DOCUMENTS

| | | | |
|---|---|---|---|
| 7,072,627 B2* | 7/2006 | Coffin, III | 455/137 |
| 7,085,529 B1* | 8/2006 | Arsenault et al. | 455/3.02 |
| 7,130,576 B1* | 10/2006 | Gurantz et al. | 455/3.02 |
| 7,149,470 B1* | 12/2006 | Shah et al. | 455/3.02 |
| 7,286,795 B2* | 10/2007 | Ducasse | 455/12.1 |
| 7,352,991 B2* | 4/2008 | Novak et al. | 455/3.02 |
| 7,542,715 B1* | 6/2009 | Gurantz et al. | 455/3.01 |
| 7,577,401 B2* | 8/2009 | Couet | 455/12.1 |
| 7,603,075 B2* | 10/2009 | Barda | 455/3.01 |
| 7,607,155 B2* | 10/2009 | Bajgrowicz | 725/72 |
| 7,719,253 B2 | 5/2010 | Fitzpatrick et al. | |
| 7,739,717 B1* | 6/2010 | Kuether et al. | 725/107 |
| 7,861,271 B2* | 12/2010 | Coman | 725/71 |
| 7,945,932 B2* | 5/2011 | James et al. | 725/68 |
| 7,950,038 B2* | 5/2011 | James et al. | 725/68 |
| 7,954,127 B2* | 5/2011 | James et al. | 725/81 |
| 8,024,759 B2* | 9/2011 | James et al. | 725/71 |
| 8,081,412 B2* | 12/2011 | Fitzpatrick et al. | 361/118 |
| 8,093,942 B2* | 1/2012 | Pitsch et al. | 329/300 |
| 8,291,455 B2* | 10/2012 | Tsai et al. | 725/68 |
| 8,433,239 B2* | 4/2013 | Fitzpatrick | 455/3.02 |
| 8,549,565 B2* | 10/2013 | James et al. | 725/63 |
| 2004/0028149 A1* | 2/2004 | Krafft et al. | 375/316 |
| 2005/0071877 A1* | 3/2005 | Navarro | 725/68 |
| 2006/0225098 A1* | 10/2006 | James et al. | 725/63 |
| 2006/0225099 A1* | 10/2006 | James et al. | 725/63 |
| 2006/0225102 A1* | 10/2006 | James et al. | 725/68 |
| 2006/0225104 A1* | 10/2006 | James et al. | 725/68 |
| 2007/0296469 A1* | 12/2007 | Fitzpatrick | 327/103 |
| 2008/0129885 A1* | 6/2008 | Yi et al. | 348/731 |
| 2008/0198791 A1* | 8/2008 | Lloyd et al. | 370/316 |
| 2009/0058397 A1 | 3/2009 | Fitzpatrick et al. | |
| 2010/0053836 A1* | 3/2010 | Xiu et al. | 361/119 |
| 2010/0071009 A1* | 3/2010 | Xiu et al. | 725/64 |
| 2010/0103580 A1* | 4/2010 | Fitzpatrick et al. | 361/118 |
| 2010/0105318 A1* | 4/2010 | Fitzpatrick et al. | 455/12.1 |
| 2011/0151769 A1* | 6/2011 | Fitzpatrick | 455/3.01 |

FOREIGN PATENT DOCUMENTS

| | | |
|---|---|---|
| GB | 2329736 | 3/1999 |
| GB | 2334125 | 8/1999 |
| GB | 2334361 | 8/1999 |
| IL | 121862 | 7/2005 |
| JP | 10093888 | 4/1998 |
| JP | 11205701 | 7/1999 |
| JP | 2007528671 | 10/2007 |
| WO | WO 98/37463 | 8/1998 |
| WO | WO2005094212 | 10/2005 |
| WO | WO2005120073 | 12/2005 |
| WO | WO 2008/091255 | 7/2008 |
| WO | WO 2008/103656 | 8/2008 |
| WO | WO2008103656 | 8/2008 |

OTHER PUBLICATIONS

CN Search Report with Englihs translation for Corresponding CN 2008801312889 dated Jan. 22, 2013.
http://en.wikipedia,org/w/index.php?title=DiSE-:qC&oldid=237242670, "DiSEqC", edited Sep. 9, 2008.
http://en.wikipedia,org/w/index,php?title=Handshaking&oldid=239176469, "Handshaking", edted Sep. 18, 2008.

* cited by examiner

METHOD FOR CONTROLLING SIGNAL TRANSMISSION FOR MULTIPLE DEVICES

This application claims the benefit, under 35 U.S.C. §365 of International Application PCT/US2008/011208, filed Sep. 26, 2008 which was published in accordance with PCT Article 21(2) on Apr. 1, 2010 in English.

The present invention generally relates to a technique for controlling signal transmission, and more particularly, to a method capable of controlling signal transmission for multiple electronic devices in a system, such as a satellite distribution system.

The ability to control signal transmission between electronic devices is an important issue related to wired and/or wireless signal distribution systems. To address this issue in certain systems, communication standards have been devised to give electronic devices the ability to send and receive digital information over a powered coaxial cable. An example of this is the communication between a satellite set-top box receiver (also known as an integrated receiver device, or IRD) and satellite antenna circuits (also known as a low noise block, or LNB). In the case of satellite receiver communication, commands are sent from the IRD to the LNB to, for example, select radio frequency (RF) bands and/or antenna signal polarity.

Several satellite IRD providers have implemented distribution systems that use a loop-through method for sharing an RF feed line between two or more IRDs. In order to share the RF feed line between multiple IRDs, these loop-through circuits must be manually switched by a user to provide exclusive service to one IRD, in the event another IRD is not in use. That is, distribution systems that use methods such as the existing loop-through method require user intervention to physically place one IRD in a standby mode (e.g., off state) before operation of another IRD device is possible. This requirement of user intervention is particularly problematic for users. For example, in distribution systems employed in large dwellings, a user may be required to traverse a relatively large distance in order to manually switch one IRD to standby mode before being able to use another IRD at another location within the system. This can be particularly inconvenient and time-consuming for users.

Accordingly, there is a need for a method capable of controlling signal transmission for multiple electronic devices in a system, such as a satellite distribution system, that avoids the aforementioned problems and controls signal transmission in a more convenient and user-friendly manner. The present invention addresses these and/or other issues.

In accordance with an aspect of the present invention, a method is disclosed. According to an exemplary embodiment, the method comprises receiving a signal indicating a request from a device, changing an operating state of a signal source to be compatible with an operation of the device in response to the signal, and providing a signal path between the device and the signal source in response to the signal.

In accordance with another aspect of the present invention, a device is disclosed. According to an exemplary embodiment, the device comprises means such as a detector for receiving and detecting a signal indicating a request from a second device; means such as a processor for changing an operating state of a signal source to be compatible with an operation of the second device in response to the signal; and means such as a switch for providing a signal path between the second device and the signal source in response to the signal.

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

The present invention described herein addresses various issues related to controlling signal transmission for multiple electronic devices in a signal distribution system. For purposes of example and explanation, the principles of the present invention will be described with specific reference to a satellite distribution system. However, it will be intuitive to those skilled in the art that the principles of the present invention may also be applied to, and implemented in, other types of signal distribution systems, including systems that employ wired and/or wireless signal transmission.

At present, at least three different methods of powered coaxial communication for providing such commands from an IRD to an LNB exist. In order to gain a better understanding of the inventive principles of the present invention, a brief description of these three existing methods will hereinafter be provided.

The first method of powered coaxial communication is known as a voltage/tone method, which employs a combination of voltage levels with or without superimposed tones. This method is accomplished by assigning digital values to various combinations of voltage levels and tone in four modes of operation, as expressed below.

| Mode | Configuration |
| --- | --- |
| Mode 1 | 13 volts no tone |
| Mode 2 | 13 volts with superimposed 22 kHz, 600 millivolt p-p tone |
| Mode 3 | 18 volts no tone |
| Mode 4 | 18 volts with superimposed 22 kHz, 600 millivolt p-p tone |

The four modes above are referred to as digital satellite equipment control (DiSEqC) version 1.0 commands, and are used in legacy satellite distribution systems, where a single IRD connects directly to a legacy LNB antenna/switch.

A second method of powered coaxial communication is known as a modulated voltage tone method. This method employs the voltage levels and tone control of DiSEqC 1.0, but pulse width modulates the superimposed tone to communicate digital data. This method is commonly referred to as DiSEqC 1.1, and is an extension of the voltage/tone method (i.e., DiSEqC 1.0).

A third method of powered coaxial communication is known as a satellite-channel router (Sat-CR) system, or DiSEqC frequency translation multi-switch (FTM). This method also uses the DiSEqC 1.1 voltage/tone modulation, but additionally provides a means for more than one IRD to simultaneously exist on the same transmission line or bus.

Signal distribution systems with a single IRD connected to a single LNB can successfully use any one of the three communication methods described above. However, systems with the added complexity of sharing the transmission line between more than one IRD require the capability of the Sat-CR method.

Figure 1:
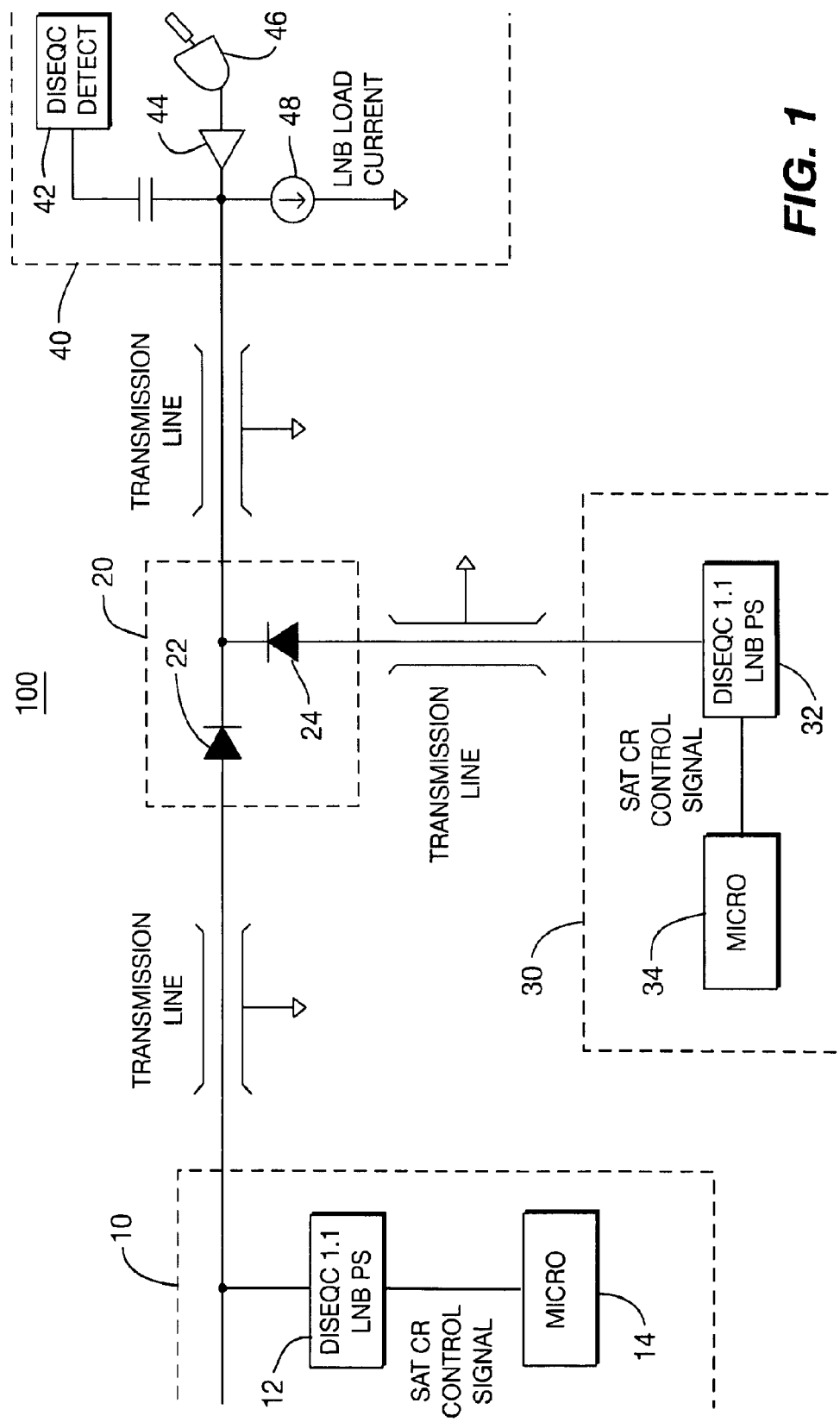
FIG. 1 is a diagram of a signal distribution system according to conventional art.

Referring now to the drawings, and more particularly to FIG. 1, a diagram of a signal distribution system 100 employing the Sat-CR method is shown. System 100 comprises IRDs 10 and 30, a signal splitter 20 and an LNB block 40 coupled via transmission lines in the manner shown in FIG. 1. IRD 10 comprises a DiSEqC LNB power supply 12 and a microprocessor 14. Signal splitter 20 comprises diodes 22 and 24. IRD 30 comprises a DiSEqC LNB power supply 32 and a microprocessor 34. LNB block 40 comprises a DiSEqC detector 42, an amplifier 44, a satellite antenna 46 and a current sink 48 (which represents the current usage of LNB block 40). IRDs 10 and 30 may be referred to as "Sat-CR capable IRDs."

Signal distribution system 100 allows IRDs 10 and 30 to share the transmission lines by providing the diode isolation of signal splitter 20 between IRDs 10 and 30 and the transmission bus. In FIG. 1, IRD 10 will only communicate by first raising the fixed transmission line voltage level from a lower level (e.g., 13 volts) to a higher level (e.g., 18 volts) which appropriately biases diodes 22 and 24 of signal splitter 20 "on" and "off", respectively. The following example demonstrates how the diode configuration of signal splitter 20 provides tone isolation and the coexistence of IRDs 10 and 30.

In a normal "non-communication state", DiSEqC LNB power supply 12 of IRD 10 and DiSEqC LNB power supply 32 of IRD 30 are both at the lower voltage level (e.g., 13 volts) and do not have a superimposed tone. When IRD 10 initiates communication with Sat-CR capable LNB block 40, it first changes the fixed output voltage from the lower voltage level (e.g., 13 volts) to the higher level (e.g., 18 volts). This action forward biases diode 22 and reverse biases diode 24 of signal splitter 20. Forward biased diode 22 then allows IRD 10 direct tone communication capability with LNB block 40, and reverse biased diode 24 takes DiSEqC LNB power supply 32 of IRD 30 out of conduction. The converse occurs when IRD 30 initiates communication.

Further standards are now in effect that allow Sat-CR capable IRDs, such as IRDs 10 and 30 of FIG. 1, to share a transmission bus with a single non Sat-CR capable IRD (also known as a "legacy IRD"). In such systems, a non Sat-CR capable (i.e., legacy) IRD requires a direct connection with a legacy capable LNB antenna/switch. It is therefore necessary to provide a means of disconnecting the Sat-CR capable IRD, and allowing the non Sat-CR capable (i.e., legacy) IRD to make that connection with the legacy capable LNB antenna/switch.

Figure 2:
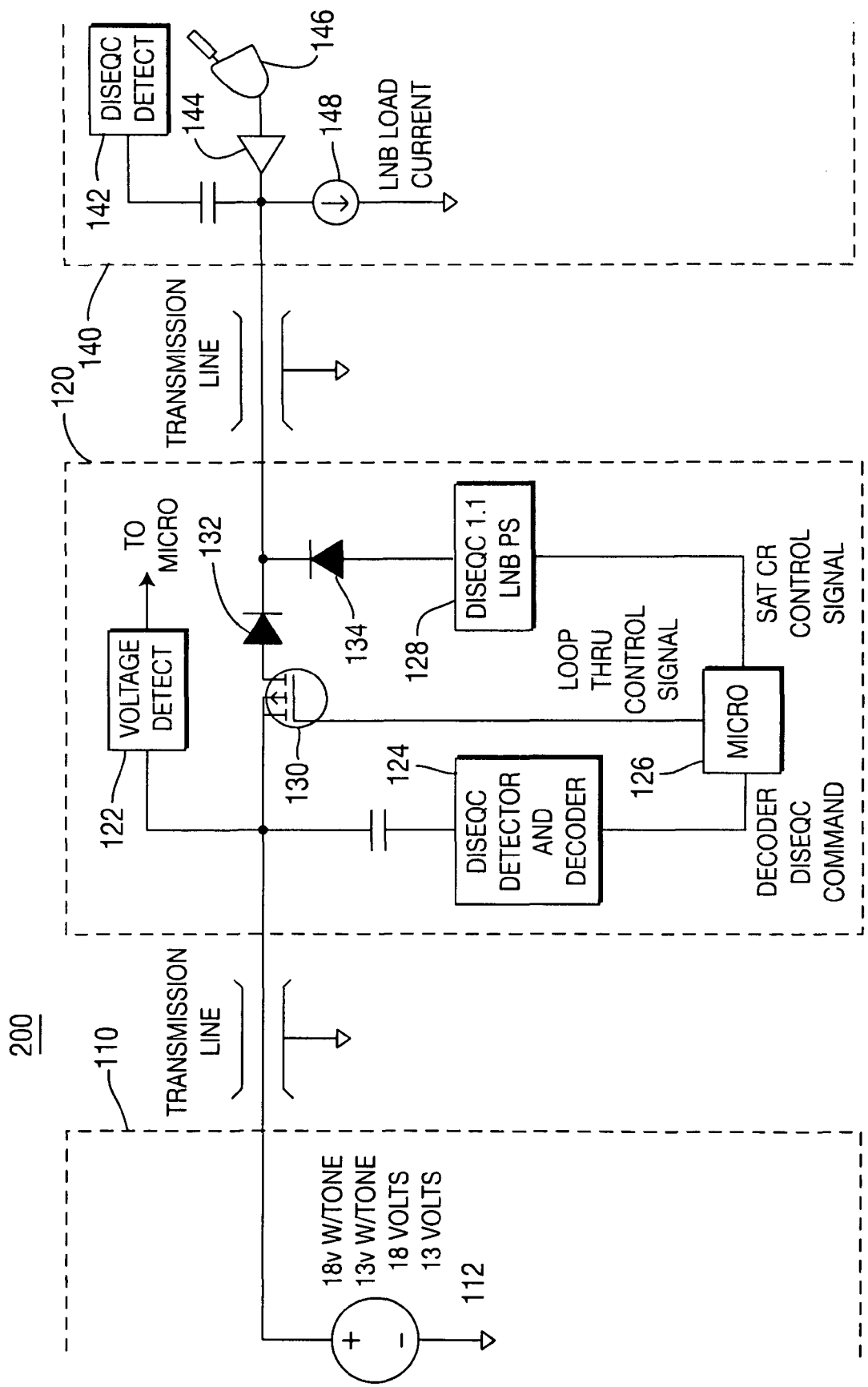
FIG. 2 is a diagram of a signal distribution system according to an exemplary embodiment of the present invention.

Referring now to FIG. 2, a diagram of a signal distribution system 200 according to an exemplary embodiment of the present invention is shown. System 200 comprises a legacy IRD 110, a non-legacy IRD 120 and an LNB block 140 coupled via transmission lines in the manner shown in FIG. 2. Legacy IRD 110 comprises a voltage source 112 which operates as a power supply. Non-legacy IRD 120 is a modified Sat-CR IRD and comprises a voltage detector 122, a DiSEqC detector and decoder 124, a microprocessor 126, a DiSEqC LNB power supply 128, a metal oxide semiconductor field effect transistor (MOSFET) 130, and diodes 132 and 134. LNB block 140 operates as a signal source for audio and/or video signals and comprises a DiSEqC detector 142, an amplifier 144, a satellite antenna 146 and a current sink 148.

LNB block 140 is capable of operating with both Sat-CR capable (i.e., non-legacy) IRDs and non Sat-CR capable (i.e., legacy) IRDs. A general description of the operation of system 200 will now be provided.

System 200 of FIG. 2 can operate in a mode that supports Sat-CR IRDs such as non-legacy IRD 120, as well as in a mode that supports a non Sat-CR IRD, such as legacy IRD 110. To facilitate operation of legacy IRD 110, voltage source 112 of legacy IRD 110 must first be connected to the transmission line to allow control of LNB block 140. This is done by biasing MOSFET 130 of non-legacy IRD 120 "on". Disconnection of non-legacy IRD 120 from the transmission line is accomplished by setting DiSEqC LNB power supply 128 to zero volts and allowing voltage source 112 of legacy IRD 110 to forward bias diode 132. This configuration shall be referred to herein as "standby mode".

If non-legacy IRD 120 is not in use and operation of legacy IRD 110 is desired, non-legacy IRD 120 can be placed in standby mode, as described above. When legacy IRD 110 takes control of the transmission line, it realizes its request for service has been granted by acquisition of tuner lock and the ability to tune desired transponder frequencies. This reception of requested content by legacy IRD 110 is conformation of a completed request transaction. When non-legacy IRD 120 is not in standby mode, MOSFET 130 is biased "off" to allow non-legacy IRD 120 full control of the transmission line. This is done to prevent legacy IRD 110 in the 18 volt mode from reverse biasing diode 132, and thus preventing non-legacy IRD 120 from communicating with LNB block 140.

Existing systems now require a user to physically place one IRD, such as a non-legacy, Sat-CR capable IRD, in standby mode (e.g., by manually turning the IRD off) when use of another IRD, such as a legacy, non Sat-CR capable IRD, is desired. This requirement presents an inconvenience to the user, particularly, for example, if the distribution system is employed in a large dwelling. According to principles of the present invention, this problem is solved by a method that places an IRD, such as a non-legacy, Sat-CR capable IRD, in standby mode in a convenient manner, and thereby allows another IRD, such as a legacy, non Sat-CR capable IRD, to control the transmission line. According to an exemplary embodiment, this method is facilitated by a communication protocol between a legacy, non Sat-CR capable IRD and a non-legacy, Sat-CR capable IRD. An example of this method will now be described with further reference to FIG. 2.

In FIG. 2, legacy IRD 110 transmits a signal indicating a request to use the transmission line to access LNB block 140. Non-legacy IRD 120 responds to this request signal by causing an on-screen banner to be displayed on a display monitor (not shown in FIG. 2) associated with non-legacy IRD 120. This on-screen banner indicates that legacy IRD 110 has requested use of the transmission line, and allows a user to grant the request by providing an input responsive to the on-screen banner. If the user fails to respond to this on-screen banner within a pre-defined time period (e.g., 10 seconds, etc.), or grants approval to the request via input (e.g., user menu selection), non-legacy IRD 120 sends a DiSEqC 1.1 command signal (or equivalent signal) to reset LNB block 140. This command signal resets LNB block 140 into a voltage tone mode which is compatible with the operation and control capability of legacy IRD 110.

According to principles of the present invention, at least four different communication methods may be used by legacy IRD 110 to request the transmission line for access to LNB block 140. These methods include a DiSEqC 1.1 command communication method, a voltage detection method, an inactivity detection method, and a future digital communication method such as Bluetooth or Ethernet, and will hereinafter be described.

According to the DiSEqC 1.1 command communication method, even when non-legacy IRD 120 is in the Sat-CR mode and controlling LNB block 140, it is still capable of listening to a DiSEqC transmission from legacy IRD 110 on the transmission line through DiSEqC detector and decoder 124. In particular, DiSEqC detector and decoder 124 have the ability to receive and decode DiSEqC tone messages that are sent on the transmission line from legacy IRD 110. This gives legacy IRD 110 the ability to send a DiSEqC 1.1 command to non-legacy IRD 120 requesting control of the transmission line, and causing non-legacy IRD 120 to enter standby mode.

Several existing DiSEqC commands and a proposed communication command are listed below.
Exemplary DiSEqC 1.1 Commands:
0xE0 0x11 0x01—Switch LNB to Vertical or Right Circular polarity
0xE0 0x11 0x00—Reset LNB
0xE0 0x00 0x00—Set Contention Flag in target device
0xE0 0x70 0x3A—Proposed command to request transmission line from non-legacy IRD 120

According to the voltage detection method, when legacy IRD 110 powers the transmission line to an operational voltage or toggles between pre-defined voltage levels, non-legacy IRD 120 interprets this as a request to use the transmission line to access LNB block 140. Non-legacy IRD 120 performs this voltage level detection through voltage detector 122, which uses conventional comparators (not shown in FIG. 2) to indicate various voltage levels such as zero volts, 13 volts or 18 volts. This detection of fixed voltage levels or changing voltage levels indicates that legacy IRD 110 is attempting to change channels or is searching for a satellite signal. Non-legacy IRD 120 responds to this detection by displaying an on-screen banner which allows a user to grant the request and thereby cause non-legacy device 120 to enter standby mode. According to an exemplary embodiment, if non-legacy IRD 120 is engaged in a recording operation, then optionally no on-screen banner will be displayed, because loss of a higher priority recording would result.

Inactivity detection is a third method for causing non-legacy IRD 120 to switch to standby mode. According to this method, if non-legacy IRD 120 has no user activity (e.g., no user inputs such as a channel change command, etc.) for a pre-defined time (e.g., 5 hours, etc.), non-legacy IRD 120 is now considered able to be placed into standby mode. In this event, microprocessor 126 of non-legacy IRD 120 causes an on-screen banner to be displayed indicating the request to release the transmission line to another IRD such as legacy IRD 110. If there is no user response to the on-screen banner, non-legacy IRD 120 will release control of the transmission line and revert to a legacy mode. If no evidence of use is sensed from legacy IRD 110, non-legacy IRD 120 will periodically power up and take control of the transmission line (e.g., to keep its electronic program guide fresh), and then go back to standby mode.

According to a fourth method, legacy IRD 110 and non-legacy IRD 120 may be equipped with digital communication means, such as Bluetooth or Ethernet. According to this method, non-legacy IRD 120 will provide a transmission line sharing capability, but will further enhance the interactive control by proving two-way communications between legacy IRD 110 and non-legacy IRD 120. For example, this two-way control gives non-legacy IRD 120 the ability to communicate back and forth with legacy IRD 110 for issues, such as the need for either IRD to refresh its electronic program guide or to record a scheduled program. In each of these cases, on-screen banners may be used to warn users of situation so that uninterrupted programming can be achievable.

According to an exemplary embodiment, non-legacy IRD 120 exits standby mode when requested by the user to go to an "active mode" (e.g., user turns on non-legacy IRD 120, etc.). Exiting standby mode is done by biasing MOSFET 130 "off", powering up DiSEqC LNB power supply 128 and issuing Sat-CR commands to control LNB block 140. Legacy IRD 110 will then experience loss of service, but may make periodic requests for service.

The principles of the present invention described herein may also be applicable to systems with multiple Sat-CR capable (i.e., non-legacy) IRDs. An example of such a system is where both IRD 110 and IRD 120 of FIG. 2 are Sat-CR capable (i.e., non-legacy) IRDs. In this case, software for microprocessor 126 of IRD 120 may interpret Sat-CR commands from IRD 110 as an indication of a downstream Sat-CR capable IRD. IRD 120 may respond to such commands by biasing MOSFET 130 "on" and operating in the shared Sat-CR mode, as illustrated in FIG. 1.

Another aspect of the present invention is the ability to allow two or more legacy IRDs to share a transmission line with a non-legacy IRD. For example, system 200 may be modified to include a second legacy IRD. This second legacy IRD also has the ability to communicate with non-legacy IRD 120 using superimposed tones. This is because MOSFET 130 is biased "off" and DiSEqC detector and decoder 124 are still capable of receiving tone type commands. Accordingly, microprocessor 126 may include software that allows two or more, legacy, non Sat-CR capable IRDs to share a single transmission line in an automated fashion.

Figure 3:
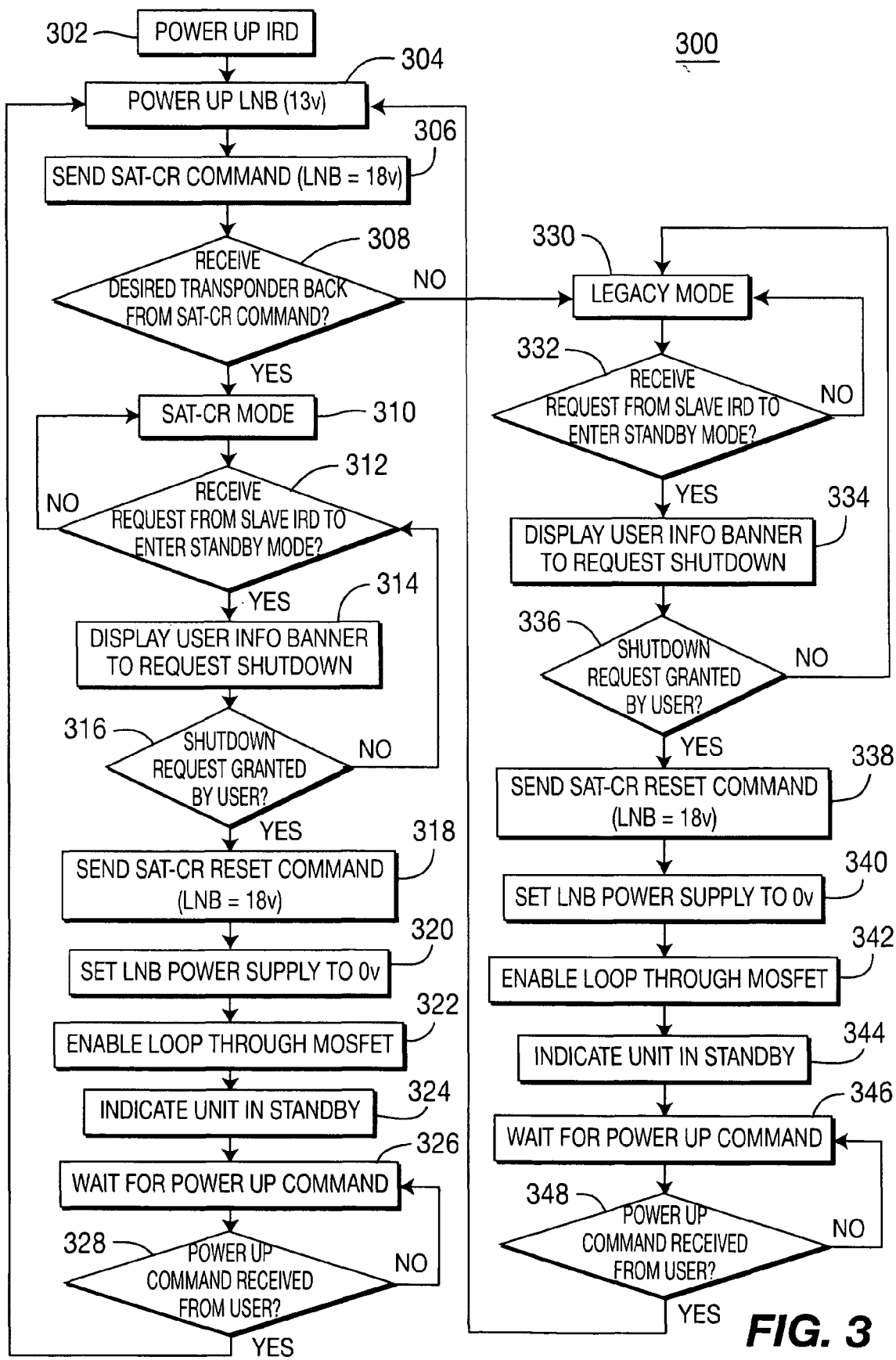
FIG. 3 is a flowchart illustrating steps performed by the non-legacy IRD of FIG. 2 according to an exemplary embodiment of the present invention.

Referring now to FIG. 3, a flowchart 300 illustrating steps performed by non-legacy IRD 120 of FIG. 2 according to an exemplary embodiment of the present invention is shown. The steps of FIG. 3, which are performed under the control of microprocessor 126, are exemplary only, and are not intended to limit the functionality of non-legacy IRD 120 or the present invention in any manner.

At step 302, non-legacy IRD 120 is powered up. According to an exemplary embodiment, step 302 is performed in response to a user providing an input which turns on non-legacy IRD 120. At step 304, non-legacy IRD 120 powers up LNB block 140. According to an exemplary embodiment, step 304 is performed by DiSEqC LNB power supply 128 generating a 13 volt signal which is output to the transmission line coupled between non-legacy IRD 120 and LNB block 140.

At step 306, non-legacy IRD 120 sends a Sat-CR command signal to LNB block 140. According to an exemplary embodiment, step 306 is performed by DiSEqC LNB power supply 128 increasing the transmission line to 18 volts and outputting a pre-defined Sat-CR command signal (e.g., transponder selection signal, etc.) to LNB block 140. At step 308, non-legacy IRD 120 determines whether it has received a desired transponder signal back from LNB block 140 in response to the Sat-CR command signal sent at step 306. According to an exemplary embodiment, the determination performed at step 308 indicates whether or not LNB block 140 is Sat-CR capable.

If the determination at step 308 is positive, process flow advances to step 310 where non-legacy IRD 120 concludes that LNB block 140 is Sat-CR capable, and therefore sets itself to a Sat-CR mode of operation. From step 310, process flow advances to step 312 where non-legacy IRD 120 (which operates as a master IRD in this example) determines whether it has received a request signal from legacy IRD 110 (which operates as a slave IRD in this example), to enter standby mode. According to an exemplary embodiment, legacy IRD 110 may request non-legacy IRD 120 to enter standby mode when legacy IRD 110 wants to access LNB block 140 for television service. To make this request, legacy IRD 110 sends the request signal to non-legacy IRD 120 as a DiSEqC command signal. If sent, this DiSEqC command (request) signal is detected and decoded by DiSEqC detector and decoder 124 of non-legacy IRD 120.

If the determination at step 312 is negative, process flow loops back to step 310 and steps 310 and 312 are repeatedly performed until a request signal from legacy IRD 110 is detected. Once a request signal from legacy IRD 110 is detected, the determination at step 312 is positive and process flow advances to step 314 where non-legacy IRD 120 causes an on-screen information banner to be displayed for a user on a display monitor requesting permission to shutdown non-legacy IRD 120 (i.e., place non-legacy IRD 120 in standby mode).

At step 316, non-legacy IRD 120 determines whether permission to shutdown non-legacy IRD 120 has been granted. According to an exemplary embodiment, the user may expressly grant or deny permission to shutdown non-legacy IRD 120 by providing one or more pre-defined inputs to non-legacy IRD 120 responsive to the on-screen information banner. Also according to an exemplary embodiment, the permission to shutdown non-legacy IRD 120 may be automatically provided if the user does not expressly grant or deny such permission within a pre-defined time period.

If the determination at step 316 is negative, process flow loops back to step 312. Alternatively, if the determination at step 316 is positive, process flow advances to step 318 where non-legacy IRD 120 sends a Sat-CR reset command signal to LNB block 140. According to an exemplary embodiment, step 318 is performed by DiSEqC LNB power supply 128 increasing the transmission line to 18 volts and outputting the Sat-CR reset command signal to LNB block 140. The Sat-CR reset command sent at step 318 resets LNB block 140 into a voltage tone mode which is compatible with the operation and control capability of legacy IRD 110.

Next, at step 320, non-legacy IRD 120 sets its DiSEqC LNB power supply 128 to zero volts. At step 322, non-legacy IRD 120 enables the loop through provided by MOSFET 130 which enables legacy IRD 110 (i.e., the slave IRD) to have a direct connection with LNB block 140. At step 324, non-legacy IRD 120 provides an on-screen display (via its associated display monitor) indicating that non-legacy IRD 120 is in standby mode. Then, at step 326, non-legacy IRD 120 waits for a power up command from a user. At step 328, non-legacy IRD 120 determines whether the power up has been received. If the determination at step 328 is negative, process flow loops back to step 326 where non-legacy IRD 120 continues to wait for a power up command from the user. Once the determination at step 328 is positive, process flow loops back to step 304.

Referring back to step 308, if the determination at that step is negative, process flow advances to step 330 where non-legacy IRD 120 concludes that LNB block 140 is not Sat-CR capable, and therefore sets itself to a legacy mode of operation. From step 330, process flow advances to step 332 where non-legacy IRD 120 (which operates as a master IRD in this example) determines whether it has received a request signal from legacy IRD 110 (which operates as a slave IRD in this example), to enter standby mode. According to an exemplary embodiment, legacy IRD 110 may request non-legacy IRD 120 to enter standby mode when legacy IRD 110 wants to access LNB block 140 for television service. To make this request, legacy IRD 110 sends the request signal to non-legacy IRD 120 as a DiSEqC command signal. If sent, this DiSEqC command (request) signal is detected and decoded by DiSEqC detector and decoder 124 of non-legacy IRD 120.

If the determination at step 332 is negative, process flow loops back to step 330 and steps 330 and 332 are repeatedly performed until a request signal from legacy IRD 110 is detected. Once a request signal from legacy IRD 110 is detected, the determination at step 332 is positive and process flow advances to step 334 where non-legacy IRD 120 causes an on-screen information banner to be displayed for a user on a display monitor requesting permission to shutdown non-legacy IRD 120 (i.e., place non-legacy IRD 120 in standby mode).

At step 336, non-legacy IRD 120 determines whether permission to shutdown non-legacy IRD 120 has been granted. According to an exemplary embodiment, the user may expressly grant or deny permission to shutdown non-legacy IRD 120 by providing one or more pre-defined inputs to non-legacy IRD 120 responsive to the on-screen information banner. Also according to an exemplary embodiment, the permission to shutdown non-legacy IRD 120 may be automatically provided if the user does not expressly grant or deny such permission within a pre-defined time period.

If the determination at step 336 is negative, process flow loops back to step 330. Alternatively, if the determination at step 336 is positive, process flow advances to step 338 where non-legacy IRD 120 sends a Sat-CR reset command signal to LNB block 140. According to an exemplary embodiment, step 338 is performed by DiSEqC LNB power supply 128 increasing the transmission line to 18 volts and outputting the Sat-CR reset command signal to LNB block 140. The Sat-CR reset command sent at step 338 resets LNB block 140 into a voltage tone mode which is compatible with the operation and control capability of legacy IRD 110.

Next, at step 340, non-legacy IRD 120 sets its DiSEqC LNB power supply 128 to zero volts. At step 342, non-legacy IRD 120 enables the loop through provided by MOSFET 130 which enables legacy IRD 110 (i.e., the slave IRD) to have a direct connection with LNB block 140. At step 344, non-legacy IRD 120 provides an on-screen display (via its associated display monitor) indicating that non-legacy IRD 120 is in standby mode. Then, at step 346, non-legacy IRD 120 waits for a power up command from a user. At step 348, non-legacy IRD 120 determines whether the power up has been received. If the determination at step 348 is negative, process flow loops back to step 346 where non-legacy IRD 120 continues to wait for a power up command from the user. Once the determination at step 348 is positive, process flow loops back to step 304. Process flow then continues in the manner shown in FIG. 3.

Figure 4:
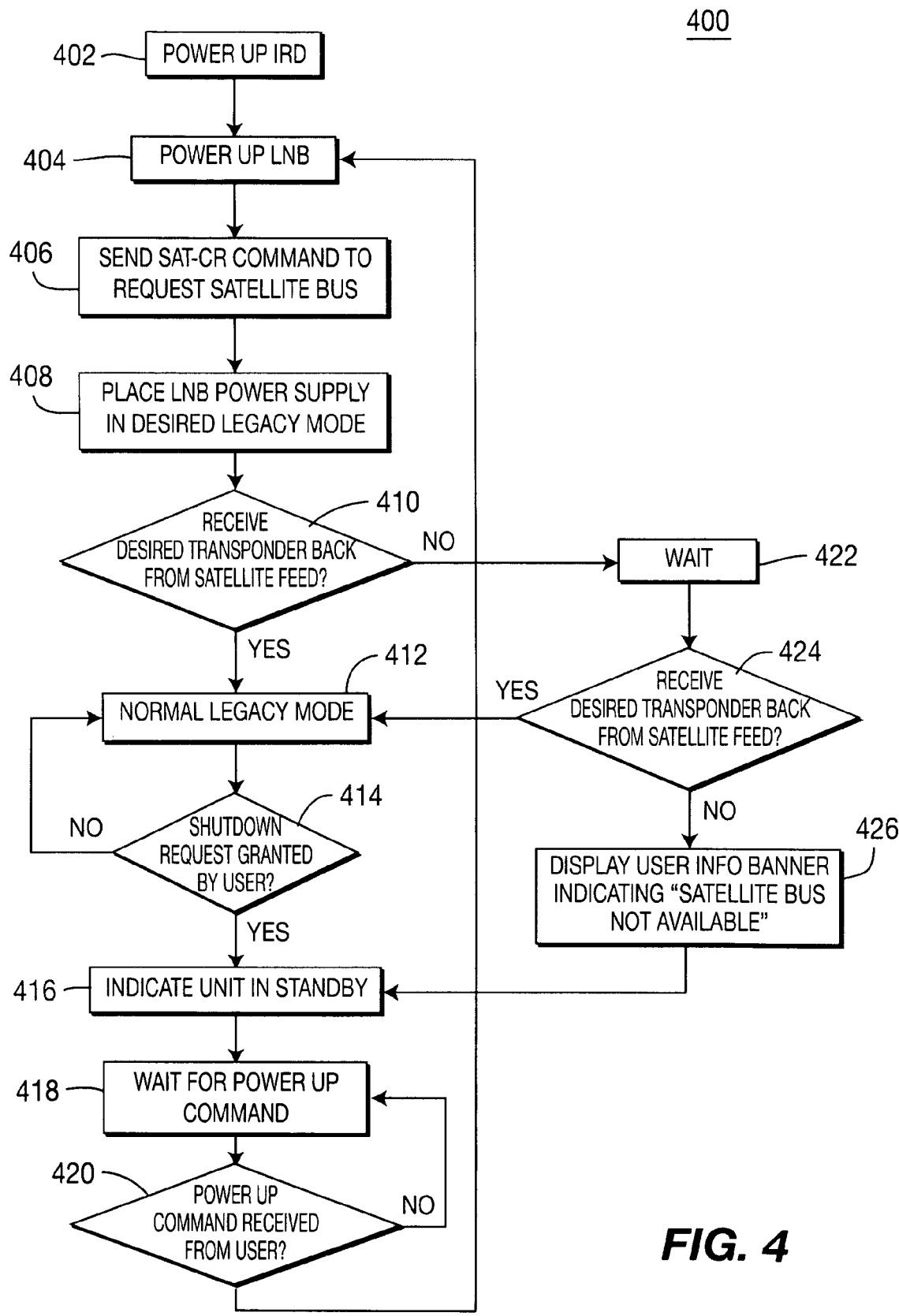
FIG. 4 is a flowchart illustrating steps performed by the legacy IRD of FIG. 2 according to an exemplary embodiment of the present invention.

Referring to FIG. 4, a flowchart 400 illustrating steps performed by legacy IRD 110 of FIG. 2 according to an exemplary embodiment of the present invention is shown. The steps of FIG. 4 are exemplary only, and are not intended to limit the functionality of legacy IRD 110 or the present invention in any manner.

At step 402, legacy IRD 110 is powered up. According to an exemplary embodiment, step 402 is performed in response to a user providing an input which turns on legacy IRD 110. At step 404, legacy IRD 110 attempts to power up LNB block 140. According to an exemplary embodiment, step 404 is performed by voltage supply 112 generating a 13 volt signal which is output to the transmission line coupled between legacy IRD 110 and non-legacy IRD 120.

At step 406, legacy IRD 110 sends a DiSEqC command signal to non-legacy IRD 120 via the transmission line to request access to LNB block 140. At step 408, legacy IRD 110 then places its voltage supply 112 in a desired legacy mode of operation. At step 410, legacy IRD 110 determines whether it has received a desired transponder signal back from LNB block 140. If the determination at step 410 is positive, process flow advances to step 412 where legacy IRD 110 operates in a normal legacy mode of operation. At step 414, legacy IRD 110 determines whether a shutdown is requested by a user; that is, legacy IRD 110 detects whether it has been turned off by the user. If the determination at step 414 is negative, steps 412 and 414 are repeatedly performed until the determination at step 414 is positive.

Once the determination at step 414 is positive, process flow advances to step 416 where legacy IRD 110 provides an on-screen display (via its associated display monitor) indicating that legacy IRD 110 is in standby mode. Then, at step 418, legacy IRD 110 waits for a power up command from a user. At step 420, legacy IRD 110 determines whether the power up has been received. If the determination at step 420 is negative, process flow loops back to step 418 where legacy IRD 110 continues to wait for a power up command from the user. Once the determination at step 420 is positive, process flow loops back to step 404.

Referring back to step 410, if the determination at that step is negative, process flow advances to step 422 where legacy IRD 110 waits for a pre-defined time period and then proceeds to step 424 where it determines whether a desired transponder signal has been received back from LNB block 140. If the determination at step 424 is positive, process flow advances to step 412 where legacy IRD 110 operates in a normal legacy mode of operation. Alternatively, if the determination at step 424 is negative, process flow advances to step 426 where legacy IRD 110 provides an on-screen user information banner (via its associated display monitor) indicating that the transmission line (i.e., satellite bus) connecting it to LNB block 140 is not available. From step 426, process flow advances to step 416 as previously described above. Process flow then continues in the manner shown in FIG. 4.

Figure 5:
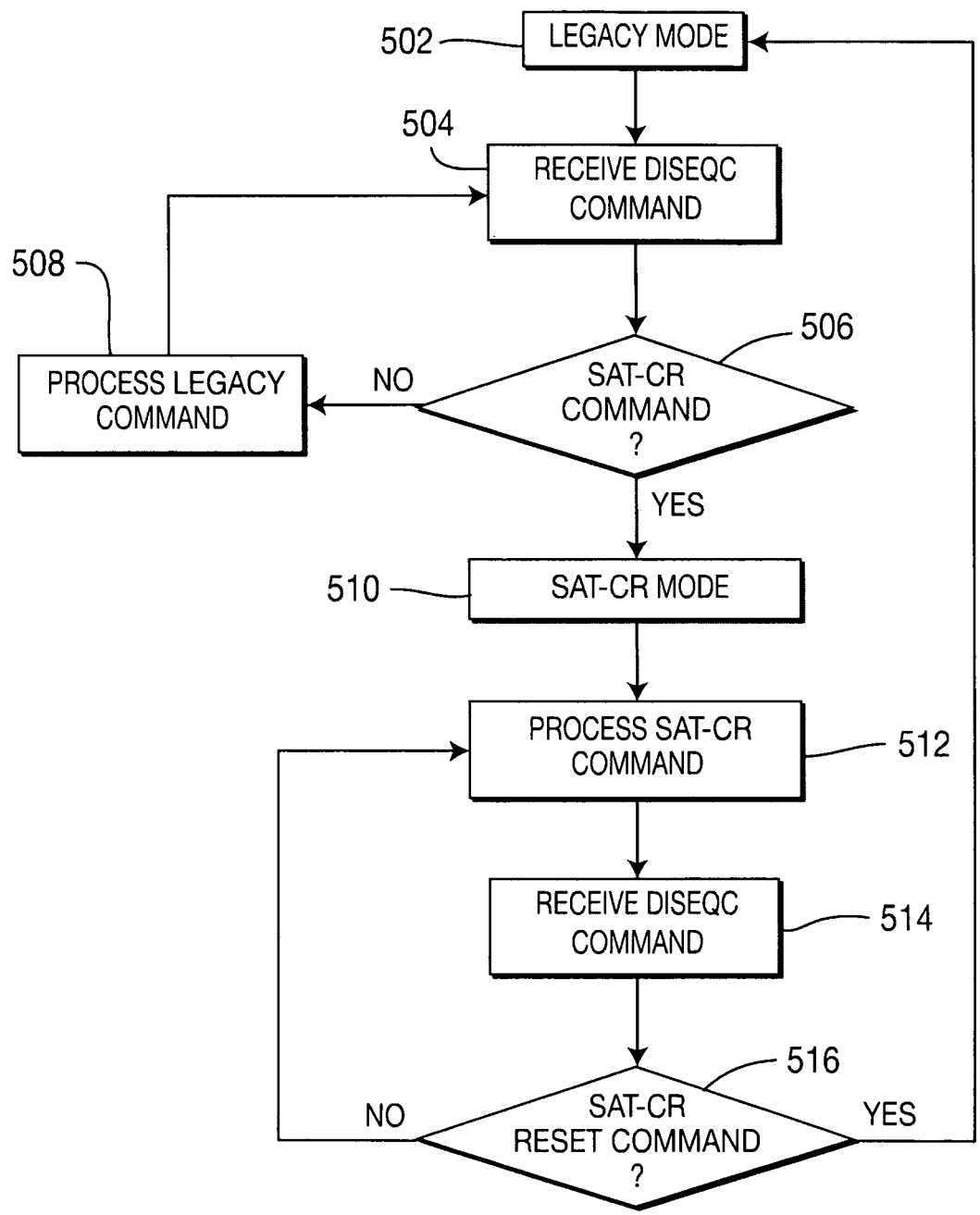
FIG. 5 is a flowchart illustrating steps performed by the LNB block of FIG. 2 according to an exemplary embodiment of the present invention.

Referring to FIG. 5, a flowchart 500 illustrating steps performed by LNB block 140 of FIG. 2 according to an exemplary embodiment of the present invention is shown. The steps of FIG. 5 are exemplary only, and are not intended to limit the functionality of LNB block 140 or the present invention in any manner.

At step 502, LNB block 140 enters a legacy mode of operation. Next, at step 504, LNB block 140 receives a DiSEqC command which is detected and decoded by DiSEqC detector 142. At step 506, LNB block 140 determines, via DiSEqC detector 142, whether the DiSEqC command received at step 504 is a Sat-CR command. If the determination at step 506 is negative, LNB block 140 processes the received DiSEqC command as a legacy command. Alternatively, if the determination at step 506 is positive, LNB block 140 sets itself to a Sat-CR mode of operation. Then, at step 512, LNB block 140 processes the received DiSEqC command as a Sat-CR command. At step 514, LNB block 140 receives another DiSEqC command which is detected and decoded by DiSEqC detector 142. At step 516, LNB block 140 determines, via DiSEqC detector 142, whether the DiSEqC command received at step 514 is a Sat-CR reset command. If the determination at step 506 is positive, process flow loops back to step 502 where legacy IRD 110 enters the legacy mode of operation. Alternatively, if the determination at step 506 is negative, process flow loops back to step 512 where legacy IRD 110 processes the received DiSEqC command as a Sat-CR command. Process flow then continues in the manner shown in FIG. 5.

As described herein, the present invention provides a method capable of controlling signal transmission for multiple electronic devices in a system such as a satellite distribution system. While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An apparatus comprising:
    first and second signal points, said first signal point coupled to a device and said second signal point coupled to a signal source, said first signal point receiving a first control signal from said device;
    a first switch coupled between said first and second signal points,
    a microprocessor, said microprocessor generating a second control signal;
    a second switch coupled to said second signal point;
    a power supply coupled to said second switch;
    a detector coupled between said first signal point and said microprocessor, said detector detecting said first control signal;
    said microprocessor coupled to said first switch turning said first switch conductive for establishing a signal path between said first and second signal points in response to a detection of said first control signal;
    said microprocessor coupled to said power supply turning said second switch non-conductive by de-activating said power supply for disabling a flow of said second control signal into said second signal point in response to said detection of said first control signal; and
    said signal path providing said first control signal at said second signal point for changing an operating state of said signal source from a first operation mode to a second operation mode.

2. The apparatus of claim 1, wherein
    said device includes a legacy integrated receiver device (IRD);
    said first switch includes a MOSFET;
    said second switch includes a diode;
    said signal source includes an low noise block (LNB);
    said first control signal includes a command employed in conjunction with a legacy IRD-LNB communication system;
    said second control signal includes a command employed in conjunction with a satellite-channel router (Sat-CR) system;
    said first operation mode includes an operation mode employed in conjunction with said legacy IRD-LNB communication system; and
    said second operation mode includes an operation mode employed in conjunction with said Sat-CR system.

3. An apparatus comprising:
    first and second signal points;
    means for receiving a first control signal at said first signal point from a device;
    means for detecting said first control signal;
    means for generating a second control signal;
    means for establishing a signal path between said first and second signal points in response to a detection of said first control signal; and means for disabling a flow of said second control signal into said second signal point in response to said detection of said first control signal, said signal path providing said first control signal at said second signal point for changing an operating state of a signal source from a first operation mode to a second operation mode.

4. The apparatus of claim 3, wherein
said device includes a legacy integrated receiver device (IRD);
said means for generating a second control signal includes a microprocessor;
said means for establishing a signal path between said first and second signal points includes a MOSFET;
said means for disabling a flow of said second control signal includes a diode;
said signal source includes an low noise block (LNB);
said first control signal includes a command employed in conjunction with a legacy IRD-LNB communication system;
said second control signal includes a command employed in conjunction with a satellite-channel router (Sat-CR) system;
said first operation mode includes an operation mode employed in conjunction with said legacy IRD-LNB communication system; and
said second operation mode includes an operation mode employed in conjunction with said Sat-CR system.

5. A method comprising the steps of:
receiving a first control signal at a first signal point from a device;
detecting said first control signal;
generating a second control signal;
establishing a signal path between said first and second signal points in response to a detection of said first control signal; and
disabling a flow of said second control signal into said second signal point in response to said detection of said first control signal,
said step of establishing a signal path providing said first control signal at said second signal point for changing an operating state of a signal source from a first operation mode to a second operation mode.

6. The method of claim 5, wherein
said signal source includes an low noise block (LNB);
said first control signal includes a command employed in conjunction with a legacy IRD-LNB communication system;
said second control signal includes a command employed in conjunction with a satellite-channel router (Sat-CR) system;
said first operation mode includes an operation mode employed in conjunction with said legacy IRD-LNB communication system; and
said second operation mode includes an operation mode employed in conjunction with said Sat-CR system.

\* \* \* \* \*